United States Patent
Song et al.

(10) Patent No.: US 9,065,136 B2
(45) Date of Patent: Jun. 23, 2015

(54) POSITIVE ELECTRODE FOR RECHARGEABLE LITHIUM BATTERY, METHOD OF PREPARING THE SAME, AND RECHARGEABLE LITHIUM BATTERY INCLUDING THE SAME

(75) Inventors: Jay-Hyok Song, Yongin-si (KR); Sang-In Park, Yongin-si (KR); Han-Eol Park, Yongin-si (KR); Ji-Hyun Kim, Yongin-si (KR); Ki-Hyun Kim, Yongin-si (KR); Yong-Chan You, Yongin-si (KR); Ha-Young Lee, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 162 days.

(21) Appl. No.: 13/550,427

(22) Filed: Jul. 16, 2012

(65) Prior Publication Data

US 2013/0065129 A1 Mar. 14, 2013

Related U.S. Application Data

(60) Provisional application No. 61/534,750, filed on Sep. 14, 2011.

(51) Int. Cl.
| | |
|---|---|
| *H01M 4/00* | (2006.01) |
| *H01M 4/58* | (2010.01) |
| *H01M 4/62* | (2006.01) |
| *H01M 10/0525* | (2010.01) |
| *H01M 4/1397* | (2010.01) |

(52) U.S. Cl.
CPC .......... *H01M 4/5825* (2013.01); *H01M 4/1397* (2013.01); *H01M 4/625* (2013.01); *H01M 10/0525* (2013.01); *Y02E 60/122* (2013.01)

(58) Field of Classification Search
None
See application file for complete search history.

(56) References Cited

U.S. PATENT DOCUMENTS

| | | | |
|---|---|---|---|
| 8,066,916 B2 | 11/2011 | Levasseur et al. | |
| 8,168,150 B2 * | 5/2012 | Hemmer et al. | 423/306 |
| 8,540,902 B2 * | 9/2013 | Xing et al. | 252/511 |
| 2009/0170003 A1 | 7/2009 | Chen et al. | |
| 2009/0236564 A1 * | 9/2009 | Yasunaga et al. | 252/506 |
| 2010/0176337 A1 | 7/2010 | Zhamu et al. | |
| 2010/0261061 A1 | 10/2010 | Yuasa et al. | |
| 2011/0027651 A1 | 2/2011 | Sun et al. | |

OTHER PUBLICATIONS

Extended European Search Report issued by the European Patent Office dated Nov. 6, 2012.
Indrajeet V. Thorat, Vipul Mathur, John N. Harb and Dean R. Wheeler, Performance of carbon-fiber-containing LiFePO$_4$, Journal of Power Sources, 2006, 673-678 vol. 162, ScienceDirect.

* cited by examiner

*Primary Examiner* — Stewart Fraser
(74) *Attorney, Agent, or Firm* — Knobbe Martens Olson & Bear LLP

(57) ABSTRACT

Provided is a positive electrode for a rechargeable lithium battery including a positive active material including a lithium phosphate compound particle and fiber-type carbon attached inside the lithium phosphate compound particle, a method of preparing the same, and a rechargeable lithium battery including the same.

13 Claims, 19 Drawing Sheets

RELATED ART

POSITIVE ELECTRODE FOR RECHARGEABLE LITHIUM BATTERY, METHOD OF PREPARING THE SAME, AND RECHARGEABLE LITHIUM BATTERY INCLUDING THE SAME

CROSS-REFERENCE TO RELATED APPLICATIONS

This application claims priority to and the benefit of Provisional Patent Application No. 61/534,750 filed in the U.S. Patent and Trademark Office on Sep. 14, 2011, the entire contents of which are incorporated herein by reference.

BACKGROUND

1. Field

This disclosure relates to a positive electrode for a rechargeable lithium battery, a method of preparing the same, and a rechargeable lithium battery including the same.

2. Description of the Related Technology

Lithium rechargeable batteries have recently drawn attention as a power source for a small portable electronic device. They use an organic electrolyte solution and thereby have twice the discharge voltage of a conventional battery using an alkali aqueous solution and as a result, have high energy density.

This rechargeable lithium battery is used by injecting an electrolyte into a battery cell including a positive electrode including a positive active material that can intercalate and deintercalate lithium and a negative electrode including a negative active material that can intercalate and deintercalate lithium.

Considering recently increasing demand of a battery for a car such as an electric vehicle (EV), a hybrid electric vehicle (HEV), and the like, there is increasing interest in more stable $LiFePO_4$ with excellent stability compared with other positive active materials.

Furthermore, since the $LiFePO_4$ has excellent cycle-life characteristic and simultaneously, costs low by using an inexpensive material, it may be usefully applied to prepare a positive active material for a rechargeable lithium battery for an energy storage system (ESS). However, the $LiFePO_4$ on the surface of a secondary particle may relatively well participate in the charge and discharge due to low electric conductivity, while the $LiFePO_4$ inside the secondary particle may not participate in the charge and discharge well.

SUMMARY OF CERTAIN INVENTIVE ASPECTS

One embodiment provides a positive electrode for a rechargeable lithium battery having excellent high rate cycle-life capability by applying excellent electric conductivity up to the center of a secondary particle.

Another embodiment provides a method of manufacturing the positive electrode for a rechargeable lithium battery.

Still another embodiment provides a rechargeable lithium battery including the positive electrode for a rechargeable lithium battery.

According to one embodiment, provided is a positive electrode for a rechargeable lithium battery including a current collector; and a positive active material layer being disposed on the current collector and including a positive active material. The positive active material may include a lithium phosphate compound particle and fiber-type carbon attached inside the lithium phosphate compound particle.

The lithium phosphate compound particle may have a size ranging from 100 to 1000 nm.

The lithium phosphate compound particle may include a compound represented by the following formula 1.

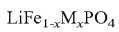   Chemical Formula 1

In Chemical Formula 1,
M is Co, Mn, V, Mg, or a combination thereof, and $0 \leq x \leq 0.20$.

The fiber-type carbon may include carbon nanotube, vapor grown carbon fiber, carbon nano fiber, or a combination thereof and in particular, carbon nanotube, carbon nano fiber, or a combination thereof.

The fiber-type carbon may have a diameter ranging from 5 to 25 nm and a length ranging from 5 to 200 μm. The length of the fiber-type carbon attached inside the lithium phosphate compound particles can be measured as follows: lithium phosphate compound particles in which the fiber-type carbon is attached are dissolved in an acid solution, such as a nitric acid solution for 0.5 to 2 hours, the fiber-type carbon attached inside the lithium phosphate compound particles are entirely exposed, and then the length of the exposed fiber-type carbon is measured using FE-SEM.

The fiber-type carbon may be included in an amount of 0.01 to 20 parts by weight based on 100 parts by weight of the lithium phosphate compound particle.

The fiber-type carbon may be 5 to 1000 nm long attached to the inside the lithium phosphate compound particle.

The positive active material may have, a spherical shape and a particle diameter (D50) ranging from 5 to 30 um. The particle diameter (D50) refers to an average diameter of particles whose cumulative volume corresponds to 50 volume % in the diameter distribution graph.

The positive active material layer may further include the carbon-based material. The carbon-based material may be powder, amorphous, or a combination thereof exist and at least one of the outside, the surface, and the inside lithium phosphate compound particle.

According to another embodiment, provided is a method of manufacturing the positive electrode for a rechargeable lithium battery, which includes mixing a lithium phosphate compound material with fiber-type carbon; drying the mixture; heat-treating the dried product; and coating the heat-treated positive active material layer material on a current collector. In some embodiments, the drying is conducted in a disk-type spray drier (about 15,000 to about 25,000 rpm of a disk rotation speed, about 200 to about 300° C. of an upper temperature, and about 100 to about 130° C. of an outlet temperature).

The lithium phosphate compound material may include $Li_2CO_3$, $FeC_2O_4 \cdot 2H_2O$, $(NH_4)_2HPO_4$, $Li_3PO_4$, $LiOH$, $LiNO_3$, $FePO_4$, $Fe_3(PO_4)_2 \cdot 8H_2O$, or a combination thereof.

The heat treatment may be performed at a temperature ranging from 650 to 800° C.

The mixing may be performed by adding a carbon-based material which is powder, amorphous, or a combination thereof to the mixture.

According to another embodiment, provided is a rechargeable lithium battery including the positive electrode; a negative electrode; and an electrolyte solution.

The positive active material has improved internal electric conductivity and realizes a rechargeable lithium battery with excellent high rate cycle-life capability.

Some embodiments relate to a positive active material for a secondary lithium battery comprising lithium phosphate compound particles represented by the following formula: $LiFe_{1-x}M_xPO_4$, wherein M is Co, Mn, V, Mg, or a combination thereof, and $0 \leq x \leq 0.20$; and fiber-type carbon, wherein at least part of the fiber-type carbon is attached to the inside of the lithium phosphate compound particles.

In some embodiments, the fiber-type carbon comprises carbon nanotube, vapor grown carbon fiber, carbon nano fiber, or a combination thereof.

In some embodiments, the fiber-type carbon has a diameter from about 5 nm to about 25 nm and a length from about 5 μm to about 200 μm.

In some embodiments, the fiber-type carbon is included in an amount of about 0.01 to about 20 parts by weight based on 100 parts by weight of the lithium phosphate compound particles.

In some embodiments, the part of the fiber-type carbon attached inside the lithium phosphate compound particles is from about 5 nm to about 1000 nm in length.

In some embodiments, the particles comprise primary particles, wherein at least part of the fiber-type carbon is attached to the inside of the primary particles.

In some embodiments, the primary particles have a size of from about 100 nm to about 1000 nm.

In some embodiments, a plurality of primary particles together form at least one secondary particle having a spherical shape and a particle diameter of from about 5 um to about 30 um.

Some embodiments further comprise a carbon-based material in powder form, amorphous form, or a combination thereof.

Some embodiments relate to a method of manufacturing a positive active material for a rechargeable lithium battery comprising: mixing fiber-type carbon with a lithium phosphate compound material represented by the formula $LiFe_{1-x}M_xPO_4$, wherein M is Co, Mn, V, Mg, or a combination thereof, and $0 \leq x \leq 0.20$, drying the mixture; and heat-treating the dried product.

In some embodiments, the lithium phosphate compound material is obtained from at least one selected from the group consisting of $Li_2CO_3$, LiOH, and $LiNO_3$, and at least one selected from the group consisting of $FePO_4$, and $Fe_3(PO_4)_2 \cdot 8H_2O$; or obtained from at least one selected from the group consisting of $Li_2CO_3$, LiOH, and $LiNO_3$, at least one selected from the group consisting of $FeC_2O_4 \cdot 2H_2O$, $FePO_4$, and $Fe_3(PO_4)_2 \cdot 8H_2O$, and at least one selected from the group consisting of $(NH_4)_2HPO_4$, and $Li_3PO_4$.

In some embodiments, the heat treatment is performed at a temperature of from about 650 to about 800° C.

In some embodiments, mixing comprises adding to the mixture a carbon-based material which is in powder form, amorphous form, or a combination thereof.

In some embodiments, the fiber-type carbon comprises carbon nanotube, vapor grown carbon fiber, carbon nano fiber, or a combination thereof.

Some embodiments relate to a secondary lithium battery comprising: a positive electrode, a negative electrode, and an electrolyte, wherein the positive electrode comprises a positive active material comprising lithium phosphate compound particles represented by the following formula: $LiFe_{1-x}M_xPO_4$, wherein M is Co, Mn, V, Mg, or a combination thereof, and $0 \leq x \leq 0.20$; and fiber-type carbon, wherein at least part of the fiber-type carbon is attached to the inside of lithium phosphate compound particles.

In some embodiments, the fiber-type carbon comprises carbon nanotube, vapor grown carbon fiber, carbon nano fiber, or a combination thereof.

In some embodiments, the fiber-type carbon has a diameter from about 5 nm to about 25 nm and a length from about 5 μm to about 200 μm.

In some embodiments, the part of the fiber-type carbon attached inside the lithium phosphate compound particles is from about 5 nm to about 1000 nm in length. Some embodiments further comprise a carbon-based material in powder form, amorphous form, or a combination thereof.

In some embodiments, the particles comprise primary particles, wherein at least part of the fiber-type carbon is attached to the inside of the primary particles.

Hereinafter, further embodiments of this disclosure will be described in detail.

BRIEF DESCRIPTION OF THE DRAWINGS

FIG. 3A is the schematic view showing the contact area of fiber-type carbon on the surface of a lithium phosphate compound particle, while

DETAILED DESCRIPTION OF CERTAIN INVENTIVE EMBODIMENTS

Example embodiments of this disclosure will hereinafter be described in detail. However, these embodiments are only examples, and this disclosure is not limited thereto.

According to one embodiment, provided is a positive electrode for a rechargeable lithium battery including a current collector and a positive active material layer on the current collector. The positive active material layer includes a positive active material including a lithium phosphate compound particle and fiber-type carbon. Herein, the fiber-type carbon is attached inside the lithium phosphate compound particle.

The positive active material layer may further include a carbon-based material as a conductive material other than the positive active material. The carbon-based material may be not fiber but powder, amorphous, or a combination thereof.

The carbon-based material may exist on at least one of the outside, the inside, and the surface of the lithium phosphate compound particle.

Figure 1:
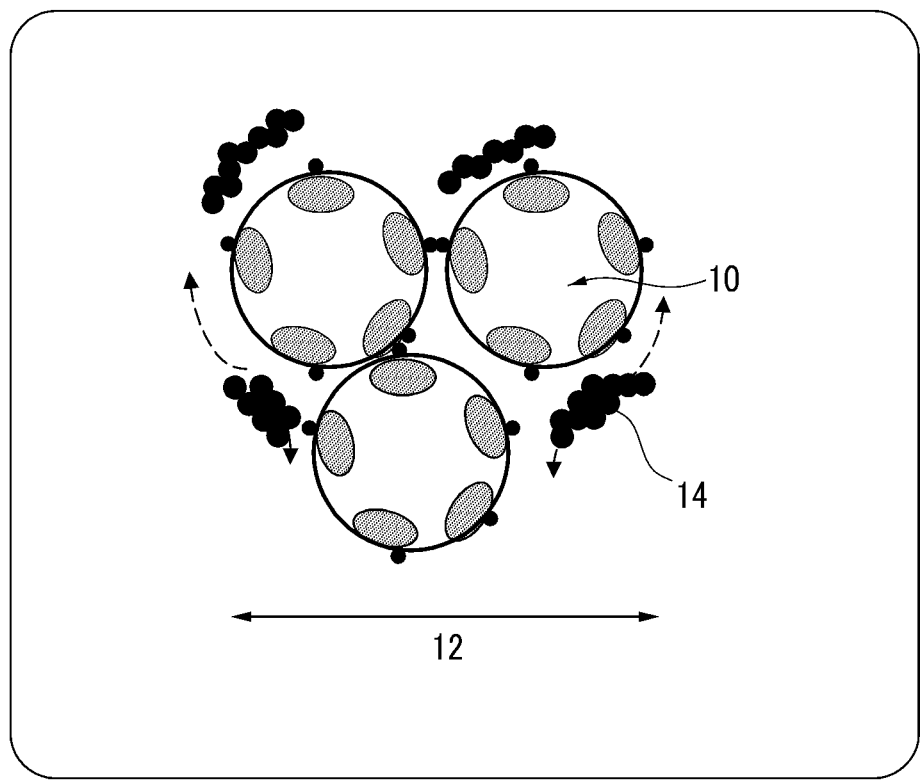
FIG. 1 is the schematic view of particles forming a conventional positive active material layer.
Figure 2:
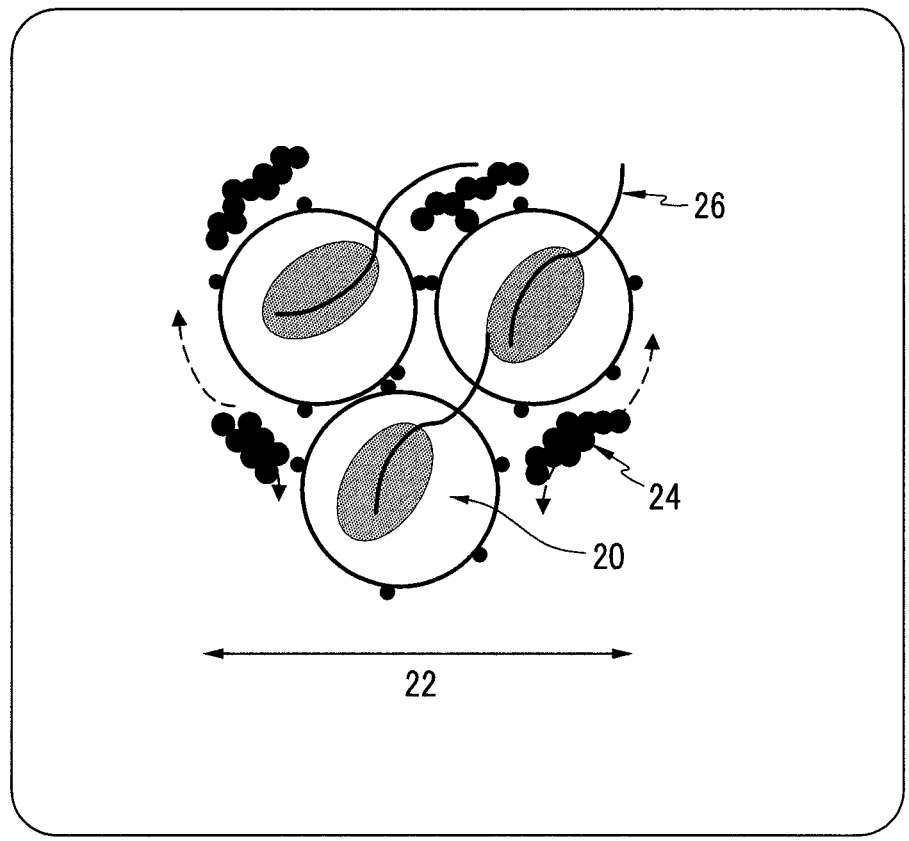
FIG. 2 is the schematic view of particles forming a positive active material layer according to one embodiment.

The positive active material layer may be specifically illustrated regarding structure referring to FIGS. 1 and 2.

FIG. 1 is the schematic view of particles forming a conventional positive active material layer, while FIG. 2 is the schematic view of particles forming a positive active material layer according to one embodiment.

First of all, the lithium phosphate compound particle is prepared by grinding a lithium phosphate compound, drying the ground compound, and firing it. Herein, the lithium phosphate compound after the firing may consist of spherical secondary particles formed of primary particles.

According to one embodiment, the lithium phosphate compound includes primary particles in which fiber-type carbon is internally attached, and the primary particles are gathered into spherical secondary particles, that is, the positive active material.

The primary particle in which fiber-type carbon is attached, the lithium phosphate compound particle, may have a size ranging from about 100 to 1000 nm, and the secondary particle, the positive active material, may have a size ranging from about 5 to 30 um.

In FIG. 1, when a carbon-based material 14 is dispersed into the primary particles 10 of the lithium phosphate compound, the carbon-based material exists on the surface of the primary particles and among the primary particles of the lithium phosphate compound. Accordingly, the secondary particles 12 of the lithium phosphate compound externally make contact with the carbon-based material and may easily participate in charge and discharge but internally do not make contact with the carbon-based material and may not easily participate in charge and discharge, decreasing electric conductivity.

However, referring to FIG. 2 according to one embodiment, a carbon-based material 24 does not only exist on the surface of the primary particles 20 of a lithium phosphate compound but also includes fiber-type carbon 26 attached inside the primary particles 20.

As shown in FIG. 2, since the fiber carbon is attached in the lithium phosphate compound particles, the lithium phosphate compound may apply electric conductivity inside the secondary particles 22, in particular, even the center of the secondary particles, compared with the lithium phosphate compound including no fiber-type carbon as shown in FIG. 1.

Figure 3A:
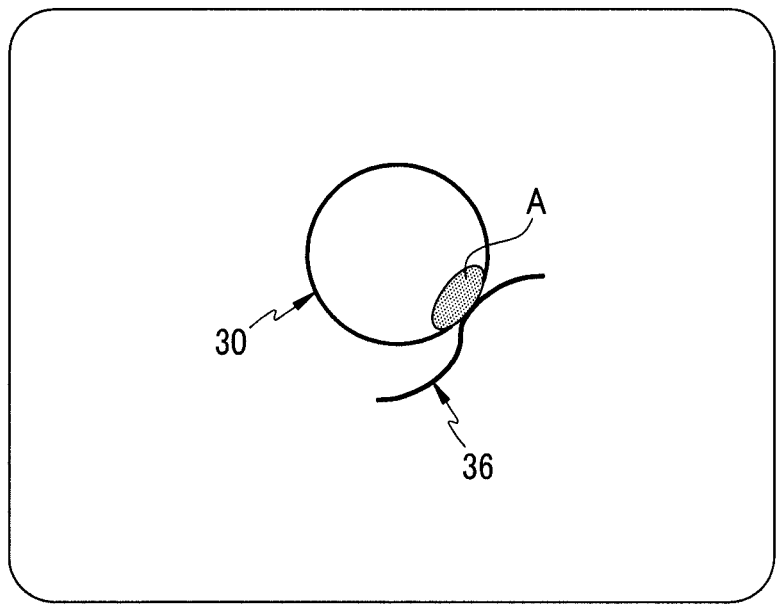
Figure 3B:
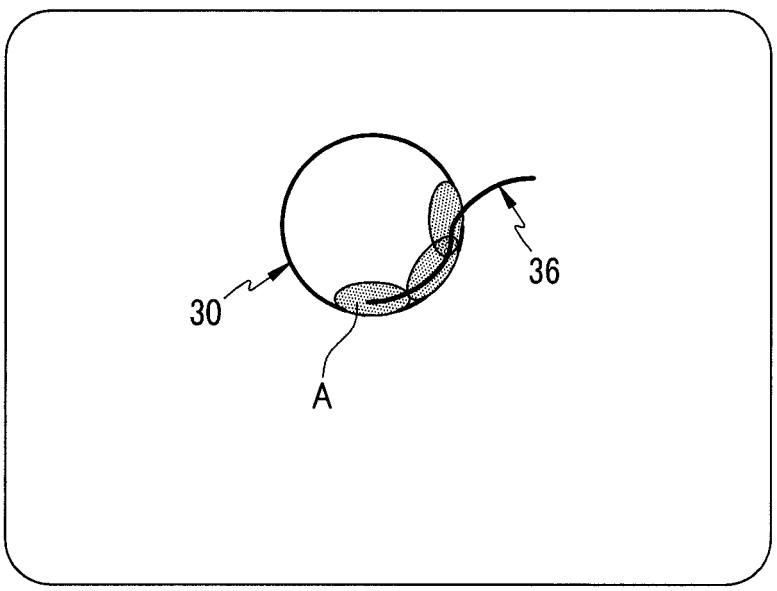
FIG. 3B is the schematic view showing the contact area of fiber-type carbon inside a lithium phosphate compound particle.

FIG. 3A is a schematic view showing the contact area of a lithium phosphate compound particle with fiber carbon when the fiber carbon exists on the surface of the lithium phosphate compound particle. FIG. 3B is a schematic view showing the contact area of a lithium phosphate compound particle with fiber carbon when the fiber carbon exists inside the lithium phosphate compound particle.

Referring to FIGS. 3A and 3B, when fiber-type carbon 36 exists inside the primary particles 30 of a lithium phosphate compound according to one embodiment, the contact area (A) is larger than when fiber-type carbon 36 exists on the surface of the primary particles 30 of a lithium phosphate compound. According to one embodiment, fiber-type carbon exists inside a lithium phosphate compound particle and thus, remarkably improves internal electric conductivity of a positive active material. Accordingly, the positive active material may accomplish excellent high rate cycle-life capability of a rechargeable lithium battery.

The structure indicates that fiber carbon is inserted inside the lithium phosphate compound particle and in particular, inside the primary particle of the phosphoric acid compound. In particular, the fiber-type carbon is 5 to 1000 nm long inserted inside the lithium phosphate compound particle and in particular, 100 to 600 nm long thereinside. When the fiber-type carbon is inserted inside the lithium phosphate compound particle within the length range, it may improve electric conductivity of a positive active material and thus, its capacity characteristic and bring about excellent high rate cycle-life capability of a rechargeable lithium battery.

The lithium phosphate compound particle may be represented by the following formula 1.

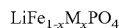 Chemical Formula 1

In Chemical Formula 1,
M is Co, Mn, V, Mg, or a combination thereof, and
$0 \leq x \leq 0.20$.

The fiber-type carbon may include carbon nanotube, vapor grown carbon fiber, carbon nano fiber, or a combination thereof and preferably, carbon nanotube, carbon nano fiber, or a combination thereof.

The fiber-type carbon may have a diameter ranging from 5 to 25 nm and in particular, from 10 to 20 nm. When the fiber-type carbon has a diameter within the range, it may maintain an appropriate contact area with the lithium phosphate compound particle and thus, improve electric conductivity of a battery. In particular, when the fiber-type carbon has a diameter of 5 nm or more, it may be prepared into multi-walled carbon nanotube and cost lower as an active material for a lithium rechargeable battery. When the fiber-type carbon has a diameter of 25 nm or less, the fiber-type carbon is attached inside a lithium phosphate compound particle and thus, improves electric conductivity of a lithium rechargeable battery.

The fiber-type carbon may be 5 to 200 μm long, in particular, 5 to 20 μm long, and in more particular, 10 to 15 μm long.

The fiber-type carbon may be included in an amount of 0.01 to 20 parts by weight and in particular, in an amount of 0.5 to 3 parts by weight based on 100 parts by weight of the lithium phosphate compound particle. When the fiber-type carbon is included within the range, it may improve electric conductivity of a lithium rechargeable battery and accomplish high capacity per mass and volume.

The carbon-based material may include natural graphite, artificial graphite, carbon black, acetylene black, ketjen black, amorphous carbon powder, or a combination thereof.

The carbon-based material may be included in an amount of 0.01 to 20 parts by weight and in particular, in an amount of 1 to 10 parts by weight based on 100 parts by weight of the lithium phosphate compound particle. When the carbon-based material is included within the range, an active material including it may improve electric conductivity of a lithium rechargeable battery and accomplish high capacity per mass and volume.

The positive active material layer may include a binder optionally as well as a positive active material and a conductive material.

The binder improves binding properties of the positive active material particles to one another and to a current collector. Examples of the binder include at least one selected from the group consisting of polyvinyl alcohol, carboxylmethyl cellulose, hydroxypropyl cellulose, diacetyl cellulose, polyvinylchloride, carboxylated polyvinyl chloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The current collector may be aluminum (Al), but is not limited thereto.

The positive electrode may be fabricated as follows.

First of all, a lithium phosphate compound material is mixed with fiber-type carbon. The mixture is dried and heat-treated to prepare a positive active material layer material. The positive active material layer material is coated on a current collector, obtaining a positive electrode.

The mixing step of the lithium phosphate compound material with the fiber-type carbon may be performed in a solvent, and a carbon-based material may be further added thereto.

The lithium phosphate compound material may include $Li_2CO_3$, $FeC_2O_4 \cdot 2H_2O$, $(NH_4)_2HPO_4$, $Li_3PO_4$, $LiOH$, $LiNO_3$, $FePO_4$, $Fe_3(PO_4)_2 \cdot 8H_2O$, or a combination thereof.

The heat treatment may be performed at a temperature ranging from 650 to 800° C. and in particular, from 700 to 750° C. When the heat treatment is performed within the temperature range, a fiber-type carbon is attached inside a lithium phosphate compound and thus, brings about excellent electric conductivity and crystalline and vertical characteristics of the lithium phosphate compound.

Hereinafter, a rechargeable lithium battery including the positive electrode is described referring to FIG. 4.

Figure 4:
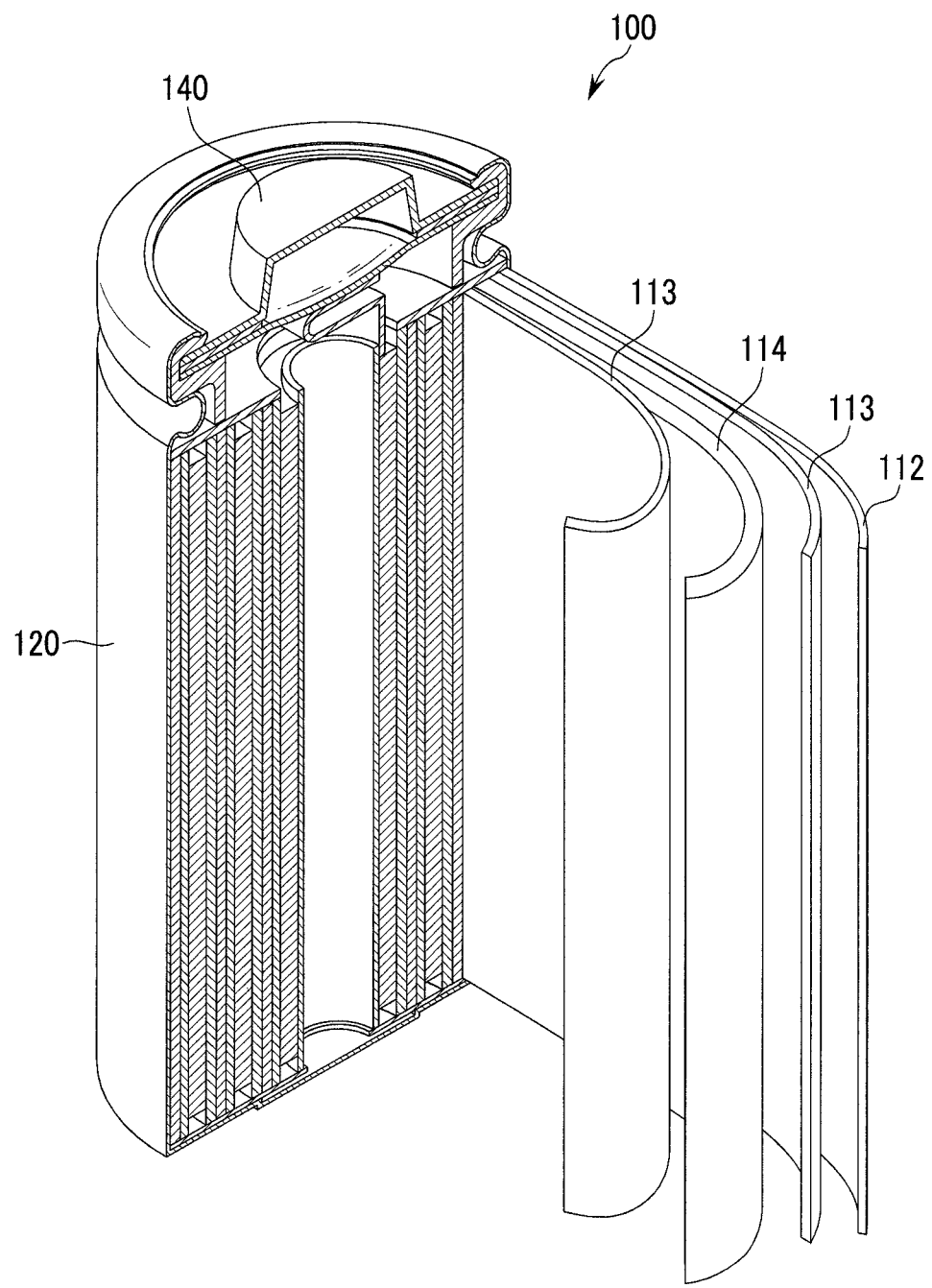
FIG. 4 is the schematic view of a rechargeable lithium battery according to one embodiment.

FIG. 4 is the schematic view of a rechargeable lithium battery according to one embodiment.

FIG. 4 illustrates a rechargeable lithium battery 100, which includes a battery cell comprising an electrode assembly including a negative electrode 112, a positive electrode 114, a separator 113 interposed between the negative electrode 112 and the positive electrode 114, and an electrolyte (not shown) impregnating the separator 113; a battery case 120 housing the battery cell; and a sealing member 140 sealing the battery case 120.

The positive electrode is the same as described above.

The negative electrode 112 includes a negative current collector and a negative active material layer disposed on the negative current collector The current collector may include a copper foil.

The negative active material layer includes a binder, and optionally a conductive material.

The negative active material includes a material that reversibly intercalates/deintercalates lithium ions, a lithium metal, a lithium metal alloy, a material being capable of doping and dedoping lithium, or a transition metal oxide.

The material that reversibly intercalates/deintercalates lithium ions includes carbon materials. The carbon material may be any generally-used carbon-based negative active material in a lithium ion rechargeable battery. Examples of the carbon material include crystalline carbon, amorphous carbon, and a mixture thereof. The crystalline carbon may be non-shaped, or sheet, flake, spherical, or fiber shaped natural graphite or artificial graphite. The amorphous carbon may be a soft carbon (carbon obtained by sintering at a low temperature), a hard carbon (carbon obtained by sintering at a high temperature), mesophase pitch carbonized product, fired coke, and the like.

Examples of the lithium metal alloy include lithium and a metal selected from the group consisting of Na, K, Rb, Cs, Fr, Be, Mg, Ca, Sr, Si, Sb, Pb, In, Zn, Ba, Ra, Ge, Al, and Sn.

Examples of the material being capable of doping and dedoping lithium include Si, $SiO_x$ (0<x<2), a Si—Y alloy (where Y is an element selected from the group consisting of an alkali metal, an alkaline-earth metal, Group 13 to 16 elements, a transition element, a rare earth element, and combinations thereof, and is not Si), Sn, $SnO_2$, a Sn—Y alloy (where Y is an element selected from the group consisting of an alkali metal, an alkaline-earth metal, Group 13 to 16 elements, a transition element, a rare earth element, and combinations thereof and is not Sn), or mixtures thereof. At least one of these materials may be mixed with $SiO_2$. The element Y may include one selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, and a combination thereof.

Examples of the transition metal oxide include vanadium oxide, lithium vanadium oxide, and the like.

The binder improves binding properties of the negative active material particles to each other and to a current collector. Examples of the binder include at least one selected from the group consisting of polyvinyl alcohol, carboxylmethyl cellulose, hydroxypropyl cellulose, polyvinyl chloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

Any electrically conductive material may be used as a conductive material unless it causes a chemical change. Examples of the conductive material include: carbon-based materials such as natural graphite, artificial graphite, carbon black, acetylene black, ketjen black, a carbon fiber, and the like; a metal-based material of a metal powder or a metal fiber including copper, nickel, aluminum, silver, and the like; a conductive polymer such as a polyphenylene derivative; and mixtures thereof.

The negative electrode 112 may be manufactured by a method including mixing the negative active material, a conductive material, and a binder to provide an active material composition, and coating the composition on a current collector. The solvent may be N-methylpyrrolidone, but it is not limited thereto.

The electrolyte solution may include the electrolyte solution described above.

The non-aqueous organic solvent serves as a medium for transmitting ions taking part in the electrochemical reaction of the battery. The non-aqueous organic solvent may include a carbonate-based, ester-based, ether-based, ketone-based, alcohol-based, or aprotic solvent.

Examples of the carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylmethyl carbonate (EMC), ethylene carbonate (EC), propylene carbonate (PC), butylene carbonate (BC), and the like.

When a linear carbonate compound and a cyclic carbonate compound are mixed with each other, the dielectric constant increases and the viscosity decreases. The cyclic carbonate compound and linear carbonate compound are mixed together in the volume ratio of from about 1:1 to about 1:9.

Examples of the ester-based solvent may include methyl acetate, ethyl acetate, n-propyl acetate, dimethylacetate, methylpropionate, ethylpropionate, γ-butyrolactone, decanolide, valerolactone, mevalonolactone, caprolactone, and the like. Examples of the ether-based solvent include dibutylether, tetraglyme, diglyme, dimethoxyethane, 2-methyltetrahydrofuran, tetrahydrofuran, and the like, and examples of the ketone-based solvent include cyclohexanone and the like. Examples of the alcohol-based solvent include ethyl alcohol, isopropyl alcohol, and the like.

The non-aqueous organic solvent may be used singularly or in a mixture. When the organic solvent is used in a mixture, the mixture ratio can be controlled in accordance with a desirable battery performance.

The non-aqueous electrolyte solution may further include an overcharge-inhibiting compound such as ethylene carbonate, pyrocarbonate, and the like.

The lithium salt supplies lithium ions in the battery, and performs a basic operation of a rechargeable lithium battery and improves lithium ion transport between positive and negative electrodes.

Examples of the lithium salt include $LiPF_6$, $LiBF_4$, $LiSbF_6$, $LiAsF_6$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (where x and y are natural numbers), LiCl, LiI, $LiB(C_2O_4)_2$ (lithium bisoxalate borate, LiBOB), or a combination thereof.

The lithium salt may be used at a concentration ranging from about 0.1 to about 2.0M. When the lithium salt is included at the concentration range, electrolyte performance and lithium ion mobility may be enhanced due to optimal electrolyte conductivity and viscosity.

The separator 113 may be formed as a single layer or a multilayer, and may be made of polyethylene, polypropylene, polyvinylidene fluoride, or a combination thereof.

Hereinafter, the embodiments are illustrated in more detail with reference to examples. However, the following are example embodiments and are not limiting.

Furthermore, what is not described in this specification can be sufficiently understood by those who have knowledge in this field and will not be illustrated here.

Fabrication of Rechargeable Lithium Battery Cell

Example 1

$Li_2CO_3$, $FeC_2O_4 \cdot 2H_2O$, and $NH_{42}HPO_4$ were mixed in a mole ratio of 1.05:1.00:1.00. The mixture was dispersed in a pure solution, obtaining $LiFePO_4$. Herein, the mixture and the pure solution were dispersed in a weight ratio of 2:8.

Next, 6 parts by weight of carbon black (based on 100 parts by weight of the $LiFePO_4$) and 1.25 parts by weight of carbon nanotube with a diameter of 10 to 20 nm and a length of 5 to 10 μm (based on 100 parts by weight of the $LiFePO_4$) was added to the first dispersion solution including $LiFePO_4$ and dispersed therein. Herein, 100 parts by weight of triton X-100 as a dispersing agent was added to 100 parts by weight of the carbon black and carbon nanotube. The mixture was agitated for 30 minutes.

The second dispersion solution was dispersed using a bead mill (a bead diameter of 0.3 mm, 2000 rpm, 3 hours). The prepared third dispersion solution was dried with a disk-type spray drier (20,000 rpm of a disk rotation speed, 250° C. of an upper temperature, 110° C. of an outlet temperature for a dried product).

The dried product was heat-treated at 700° C. in an electric oven ($N_2:H_2$=95:5 of a volume ratio, a total gas amount of 20 L/min, treatment time of 10 hours), preparing a positive active material layer.

Then, the positive active material layer was coated on an aluminum foil, fabricating a positive electrode.

The positive electrode and metal lithium as its counter electrode were used to fabricate a coin-type half-cell. Herein, an electrolyte solution was prepared by mixing ethylenecarbonate (EC), ethylmethylcarbonate (EMC), and dimethylcarbonate (DMC) in a volume ratio of 1:1:1 and dissolving $LiPF_6$ with 1M of a concentration in the mixed solvent.

Example 2

A half-cell was fabricated according to the same method as Example 1 except for using 2.5 parts by weight of carbon nanotube (based on 100 parts by weight of the $LiFePO_4$).

Example 3

A half-cell was fabricated according to the same method as Example 1 except for fabricating a positive electrode by using carbon nanotube with a diameter ranging from 10 to 15 nm and a length ranging from 10 to 20 μm.

Example 4

A half-cell was fabricated according to the same method as Example 1 except for fabricating a positive electrode using 2.5 parts by weight of carbon nanotube with a diameter of 10 to 15 nm and a length of 10 to 20 μm (based on 100 parts by weight of the $LiFePO_4$).

Example 5

A half-cell was fabricated according to the same method as Example 1 except for fabricating a positive electrode by using 2.5 parts by weight of carbon nanotube (based on 100 parts by weight of the $LiFePO_4$) and heat-treating the mixture at 650° C.

Example 6

A half-cell was fabricated according to the same method as Example 1 except for fabricating a positive electrode by using 2.5 parts by weight of carbon nanotube (based on 100 parts by weight of the $LiFePO_4$) and heat-treating the mixture at 750° C.

Example 7

A half-cell was fabricated according to the same method as Example 1 except for fabricating a positive electrode by using 2.5 parts by weight of carbon nanotube (based on 100 parts by weight of the $LiFePO_4$) and heat-treating the mixture at 800° C.

Comparative Example 1

A half-cell was fabricated according to the same method as Example 1 except for fabricating a positive electrode by adding no carbon nanotube.

Comparative Example 2

A half-cell was fabricated according to the same method as Example 1 except for fabricating a positive electrode by adding no carbon nanotube and heat-treating the mixture at 600° C.

Comparative Example 3

A half-cell was fabricated according to the same method as Example 1 except for fabricating a positive electrode by adding no carbon nanotube and heat-treating the mixture at 650° C.

Comparative Example 4

A half-cell was fabricated according to the same method as Example 1 except for fabricating a positive electrode by adding no carbon nanotube and heat-treating the mixture at 750° C.

Comparative Example 5

A half-cell was fabricated according to the same method as Example 1 except for fabricating a positive electrode by adding no carbon nanotube and heat-treating the mixture at 800° C.

Comparative Example 6

A half-cell was fabricated according to the same method as Example 1 except for fabricating a positive electrode by adding no carbon nanotube and heat-treating the mixture at 850° C.

Reference Example 1

A half-cell was fabricated according to the same method as Example 1 except for fabricating a positive electrode by using 2.5 parts by weight of carbon nanotube (based on 100 parts by weight of the LiFePO$_4$) and heat-treating the mixture at 600° C.

Reference Example 2

A half-cell was fabricated according to the same method as Example 1 except for fabricating a positive electrode by using 2.5 parts by weight of carbon nanotube (based on 100 parts by weight of the LiFePO$_4$) and heat-treating the mixture at 850° C.

Evaluation 1: FE-SEM Photograph Analysis of Fiber-Type Carbon

Figure 5:
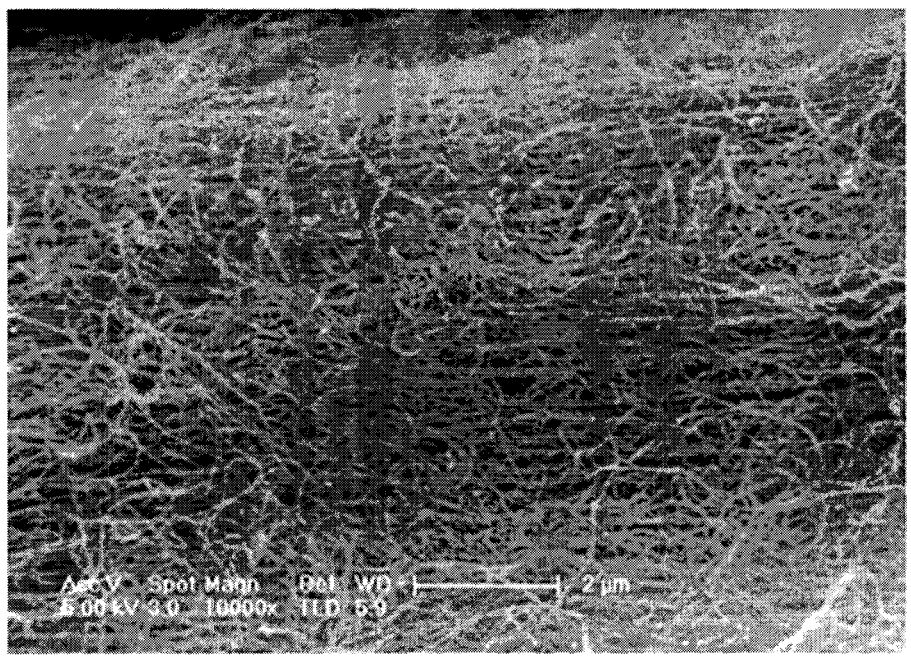
FIGS. 5 and 6 provide FE-SEM photographs of fiber carbon respectively used in Examples 1 and 3.
Figure 6:
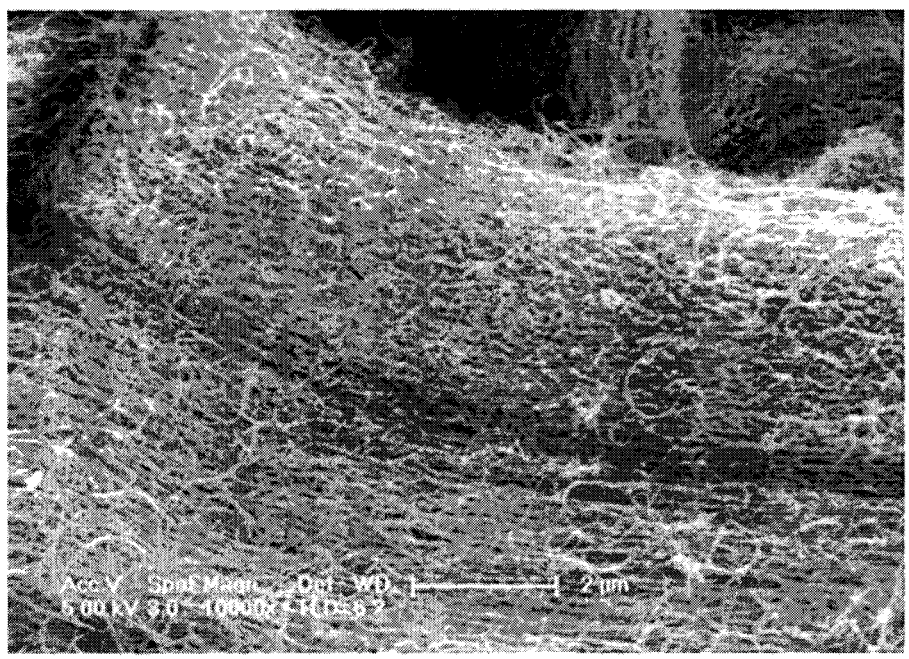
Figure 7:
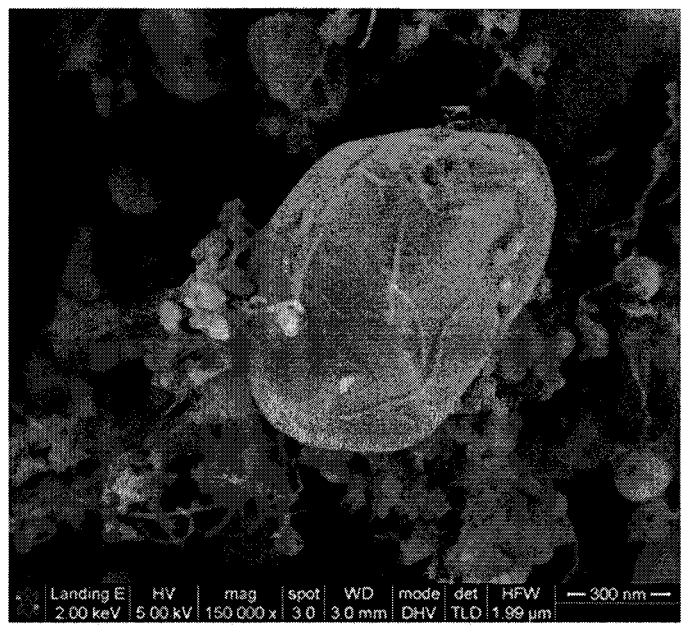
FIGS. 7 to 11 respectively provide the SEM photograph of each positive active material layer according to Examples 2 and 4 to 7, FIGS. 12 to 17 provide SEM photograph of each positive active material layer according to Comparative Examples 1 to 6, and FIGS. 18 and 19 respectively provide the SEM photograph of each positive active material layer according to Reference Examples 1 and 2.
Figure 8:
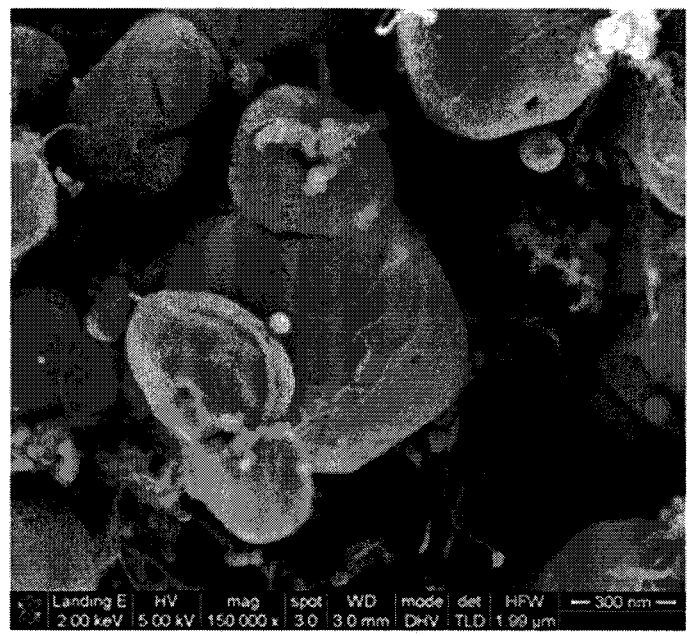
Figure 9:
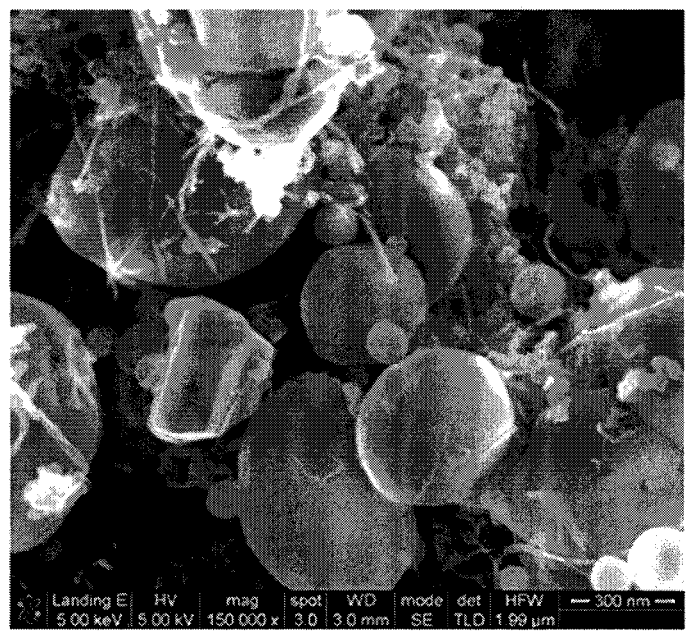
Figure 10:
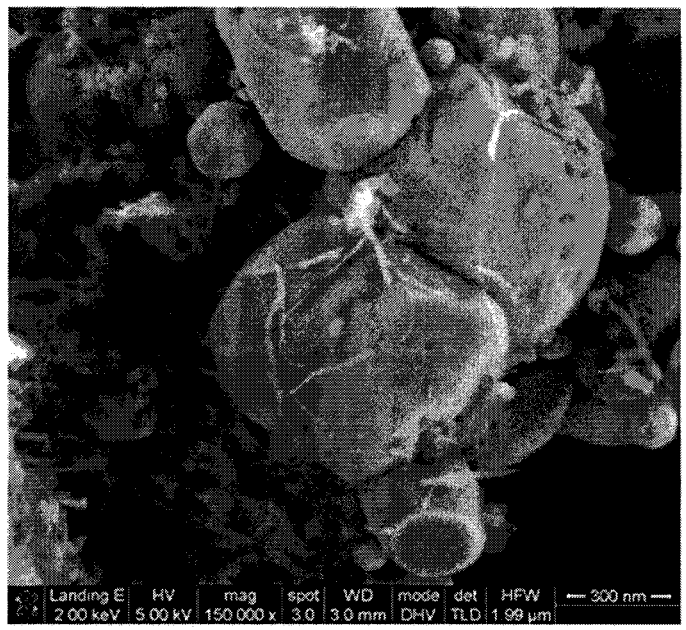
Figure 11:
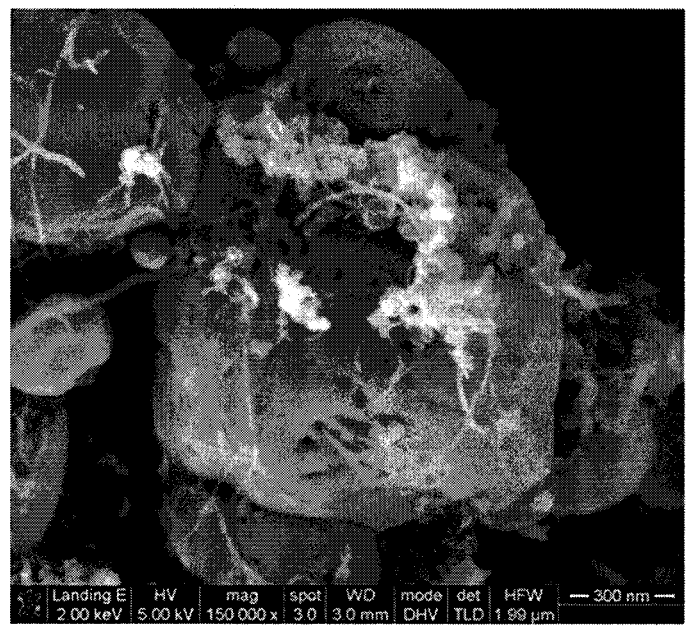
Figure 12:
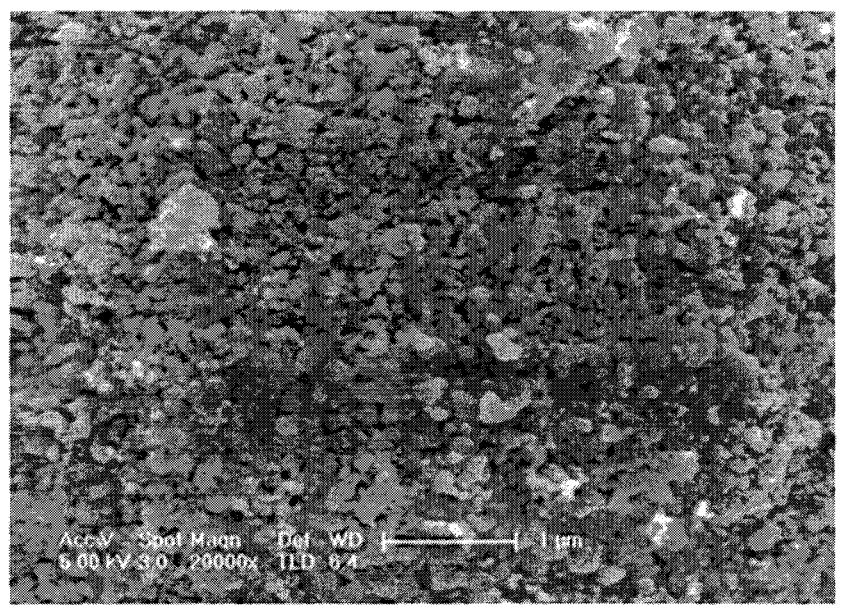
Figure 13:
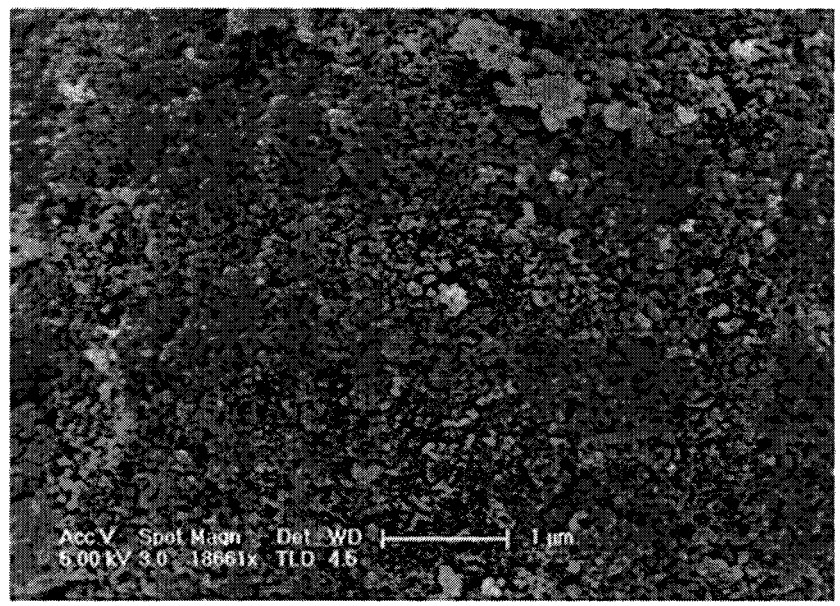
Figure 14:
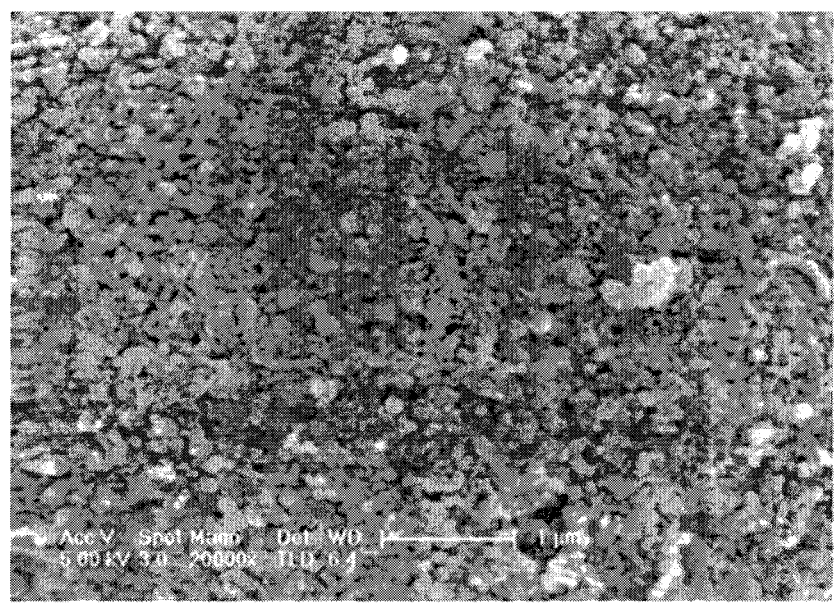
Figure 15:
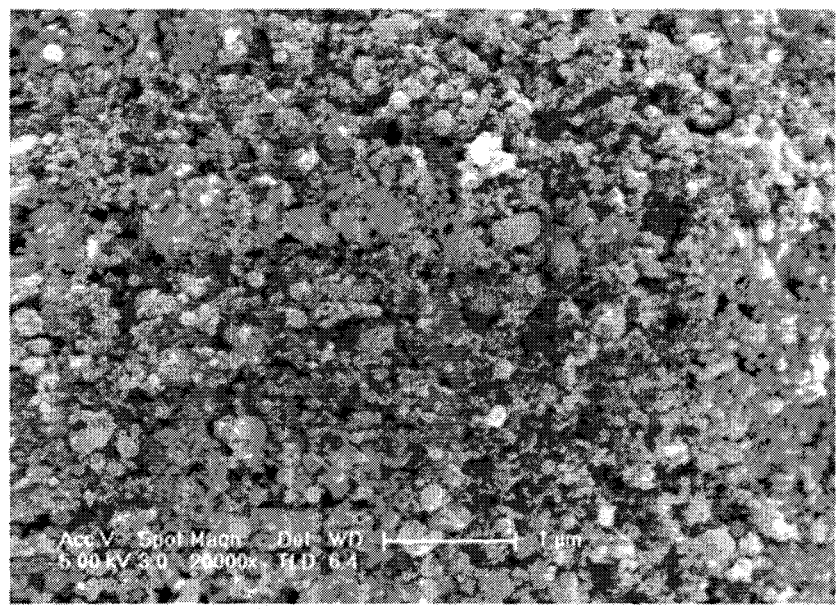
Figure 16:
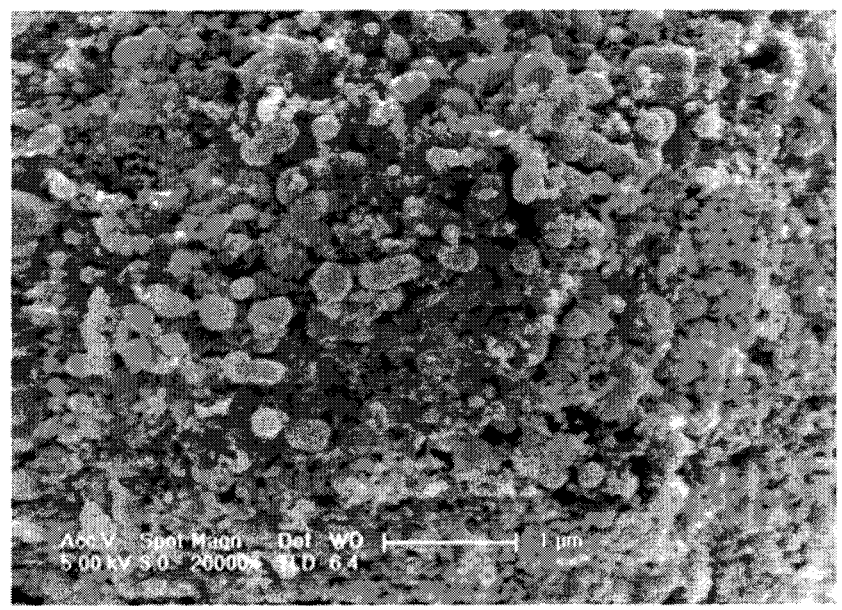
Figure 17:
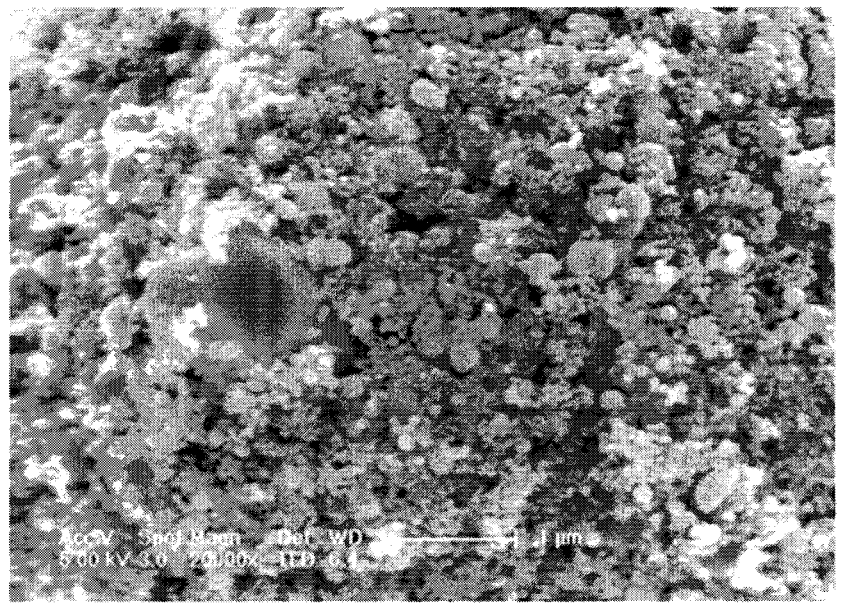

FE-SEM (Field Emission-Scanning Electron Microscopy) photographs of each fiber-type carbon according to Examples 1 and 3 were respectively provided in FIGS. 5 and 6.

FIGS. 5 and 6 respectively provide the FE-SEM photographs of each fiber-type carbon used in Examples 1 and 3.

Referring to FIGS. 5 and 6, a carbon material attached in a lithium phosphate compound particle had a fiber-type structure. Accordingly, the carbon material may be smoothly inserted into the lithium phosphate compound particle and increase an internal contact area, improving electric conductivity of a positive active material.

Evaluation 2: SEM Photograph Analysis of Positive Active Material Layer

SEM (scanning electron microscope) photographs of the positive active material layers according to Examples 2 and 4 to 7, Comparative Examples 1 to 6 and Reference Examples 1 and 2 were evaluated and respectively provided in FIGS. 7 to 11, FIGS. 12 to 17, and FIGS. 18 and 19.

FIGS. 7 to 11 respectively provide SEM photographs of the positive active material layers of Examples 2 and 4 to 7. FIGS. 12 to 17 respectively provide SEM photographs of the positive active material layers of Comparative Examples 1 to 6, and FIGS. 18 and 19 respectively provide SEM photographs of the positive active material layers of Reference Examples 1 and 2.

Figure 18:
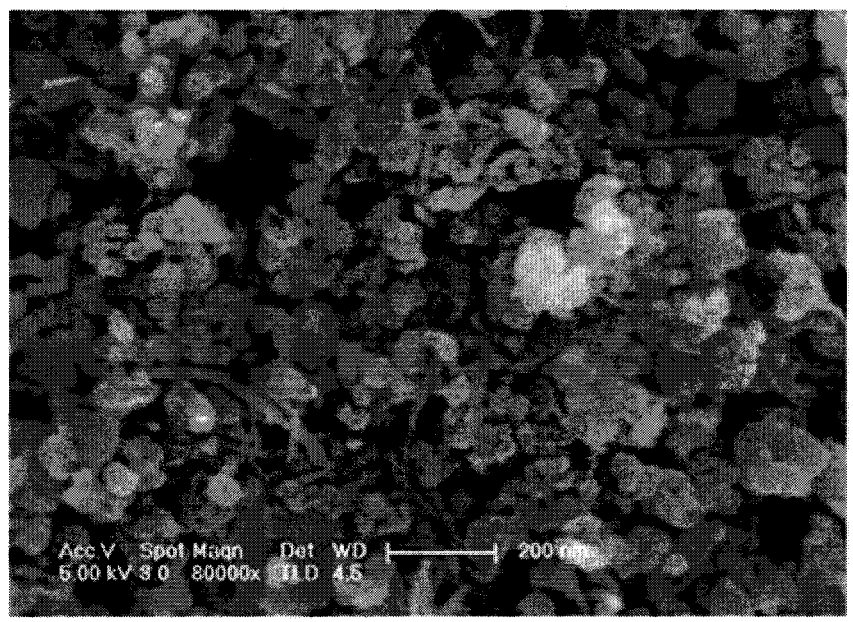
Figure 19:
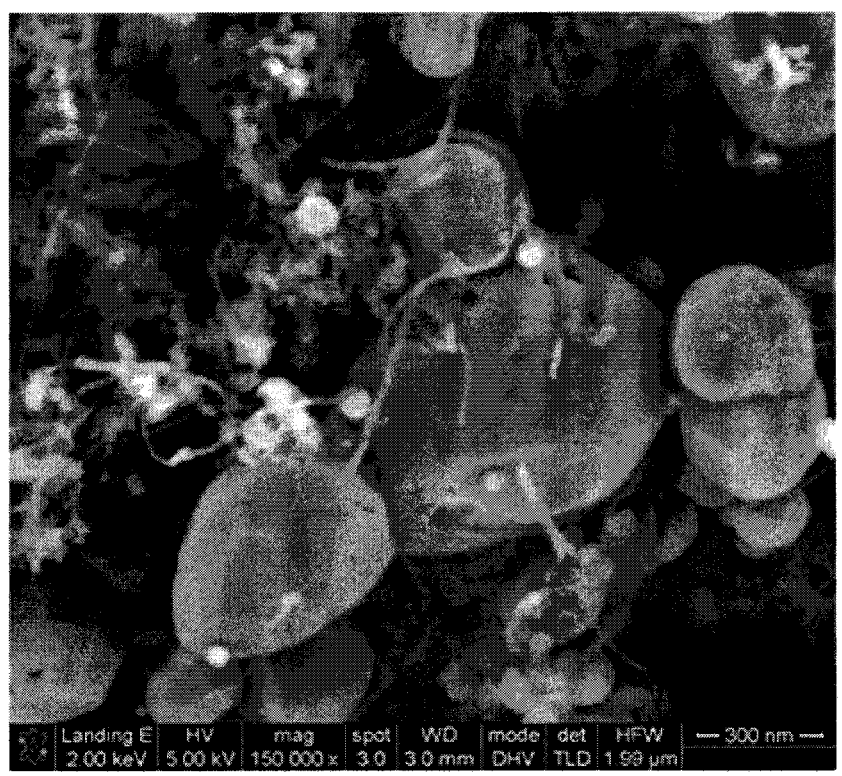

Referring to FIGS. 7 to 11, a fiber-type carbon was pierced into a lithium phosphate compound particle and attached therein. On the other hand, FIGS. 12 to 17 show that not a fiber-type carbon but a carbon-based material exists on the surface of a lithium phosphate compound particle. FIGS. 18 and 19 show that a fiber-type carbon is not pierced into a lithium phosphate compound particle, but exists on the surface of a lithium phosphate compound particle Evaluation 3: Electric Conductivity of Positive Active Material Layer The positive active material layers according to Examples 1 to 7, Comparative Examples 1 to 6, and Reference Examples 1 and 2 were measured regarding electric conductivity by using a powder conductivity meter. The results are provided in the following Table 1. Herein, the specimen was 2 g, and the powder was pressed with 20 kN.

TABLE 1

|  | Electric conductivity (S/cm) |
|---|---|
| Example 1 | $7.12 \times 10^{-2}$ |
| Example 2 | $1.17 \times 10^{-1}$ |
| Example 3 | $6.98 \times 10^{-2}$ |
| Example 4 | $1.32 \times 10^{-1}$ |
| Example 5 | $1.25 \times 10^{-1}$ |
| Example 6 | $1.21 \times 10^{-1}$ |
| Example 7 | $1.09 \times 10^{-1}$ |
| Comparative Example 1 | $2.42 \times 10^{-2}$ |
| Comparative Example 2 | $2.78 \times 10^{-2}$ |
| Comparative Example 3 | $2.63 \times 10^{-2}$ |
| Comparative Example 4 | $2.14 \times 10^{-2}$ |
| Comparative Example 5 | $1.72 \times 10^{-2}$ |
| Comparative Example 6 | $1.76 \times 10^{-2}$ |
| Reference Example 1 | $6.38 \times 10^{-2}$ |
| Reference Example 2 | $5.74 \times 10^{-2}$ |

Based on Table 1, the positive active material layers including a fiber-type carbon attached in a lithium phosphate compound particle according to Examples 1 to 7 had higher electric conductivity than the positive active material layers including a carbon-based material on the surface of lithium phosphate compound particle and among the particles according to comparative Examples 1 to 6.

In addition, the positive active material layers according to Examples 1 to 7 had higher electric conductivity than the positive active material layers including a fiber-type carbon on the surface of lithium phosphate compound particle according to Reference Examples 1 and 2.

Evaluation 4: High Rate Cycle-Life Capability of Rechargeable Lithium Battery

The rechargeable lithium batteries according to Examples 1 to 7, Comparative Examples 1 to 6, and Reference Examples 1 and 2 were charged and discharged and then, measured regarding cycle-life. The results are provided in the following Table 2.

The rechargeable lithium batteries were measured regarding charge and discharge characteristic within a region of 2.0 to 4.2V. Herein, the rechargeable lithium batteries were charged and discharged at a speed of 0.1 C, 3.0 C and 5.0 C by adjusting a current.

TABLE 2

|  | Capacity (mAh/g) | | | | | Efficiency | Capacity retention (%)** | | |
|---|---|---|---|---|---|---|---|---|---|
|  | 0.1 C charge | 0.1 C discharge | 1.0 C discharge | 3.0 C discharge | 5.0 C discharge | (%)* | 1.0 C/0.1 C | 5.0 C/0.1 C | 3.0 C/1.0 C |
| Example 1 | 151.2 | 151.1 | 135.3 | 123.4 | 118.0 | 100 | 90 | 78 | 91 |
| Example 2 | 147.6 | 148.6 | 138.7 | 129.2 | 125.5 | 101 | 93 | 84 | 93 |
| Example 3 | 152.9 | 152.7 | 135.6 | 124.2 | 118.8 | 100 | 89 | 78 | 92 |
| Example 4 | 148.2 | 148.0 | 139.2 | 130.3 | 126.3 | 100 | 94 | 85 | 94 |
| Example 5 | 144.7 | 144.7 | 138.1 | 134.6 | 129.8 | 100 | 95 | 90 | 97 |

TABLE 2-continued

| | Capacity (mAh/g) | | | | Efficiency | Capacity retention (%)** | | |
| --- | --- | --- | --- | --- | --- | --- | --- | --- |
| | 0.1 C charge | 0.1 C discharge | 1.0 C discharge | 3.0 C discharge | 5.0 C discharge | (%)* | 1.0 C/0.1 C | 5.0 C/0.1 C | 3.0 C/1.0 C |
| Example 6 | 148.6 | 148.5 | 134.9 | 125.1 | 124.6 | 100 | 91 | 84 | 93 |
| Example 7 | 137.1 | 135.8 | 113.8 | 112.5 | 105.3 | 99 | 84 | 78 | 99 |
| Comparative Example 1 | 153.9 | 153.2 | 129.7 | 116.0 | 108.4 | 100 | 85 | 70 | 89 |
| Comparative Example 2 | 112.5 | 107.3 | 87.3 | 52.6 | 31.7 | 95 | 81 | 30 | 60 |
| Comparative Example 3 | 146.5 | 146.3 | 130.3 | 121.5 | 119.2 | 100 | 89 | 81 | 93 |
| Comparative Example 4 | 150.4 | 150.6 | 123.3 | 111.8 | 103.8 | 100 | 82 | 69 | 91 |
| Comparative Example 5 | 139.5 | 135.4 | 111.2 | 97.1 | 88.8 | 97 | 82 | 66 | 87 |
| Comparative Example 6 | 128.7 | 126.5 | 105.1 | 89.4 | 74.6 | 98 | 83 | 59 | 85 |
| Reference Example 1 | 109.3 | 104.2 | 73.5 | 53.2 | 33.9 | 95 | 71 | 33 | 72 |
| Reference Example 2 | 127.5 | 126.7 | 108.3 | 93.2 | 79.1 | 99 | 85 | 62 | 86 |

*Efficiency (%) is a percentage of 0.1 C discharge capacity against 0.1 C charge capacity.
**Capacity retention (%) is each percentage of 1.0 C discharge capacity against 0.1 C discharge capacity, 5.0 C discharge capacity against 0.1 C discharge capacity, and 3.0 C discharge capacity against 1.0 C discharge capacity.

Based on the results in Table 2, the cells including a positive electrode having a fiber-type carbon internally attached in a lithium phosphate compound particle according to Examples 1 to 7 had high capacity and excellent high rate cycle-life capability compared with the cells including a positive electrode having a carbon-based material on the surface or among the lithium phosphate compound particles according to Comparative Example 1 to 6.

In particular, referring to Examples 1 to 4, as a fiber-type carbon was increasingly added, the cells had a little decreased 0.1 C charge capacity and 0.1 C discharge capacity. The reason is that carbon remaining in a positive active material decreases the amount of a lithium phosphate compound and thus, a little decreases capacity per weight of a positive active material.

In addition, the cells including a positive electrode having a fiber-type carbon internally attached in a lithium phosphate compound particle according to Examples 1 to 7 had high capacity and excellent high rate cycle-life capability compared with the cells including a positive electrode having a fiber-type carbon on the surface of lithium phosphate compound particles according to Reference Examples 1 and 2.

While this disclosure has been described in connection with what is presently considered to be practical example embodiments, it is to be understood that the disclosure is not limited to the disclosed embodiments, but, on the contrary, is intended to cover various modifications and equivalent arrangements included within the spirit and scope of the appended claims.

What is claimed is:

1. A positive active material for a secondary lithium battery comprising lithium phosphate compound particles represented by the following formula:

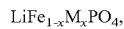

$LiFe_{1-x}M_xPO_4$, wherein M is Co, Mn, V, Mg, or a combination thereof, and $0 \leq x \leq 0.20$; and fiber-type carbon, wherein at least part of the fiber-type carbon is attached to an inside of the lithium phosphate compound particles; wherein the fiber-type carbon has a diameter from about 5 nm to about 25 nm and a length from about 5 μm to about 200 μm.

2. The positive active material of claim 1, wherein the fiber-type carbon comprises carbon nanotube, vapor grown carbon fiber, carbon nano fiber, or a combination thereof.

3. The positive active material of claim 1, wherein the fiber-type carbon is included in an amount of about 0.01 to about 20 parts by weight based on 100 parts by weight of the lithium phosphate compound particles.

4. The positive active material of claim 1, wherein the part of the fiber-type carbon attached inside the lithium phosphate compound particles is from about 5 nm to about 1000 nm in length.

5. The positive active material of claim 1, wherein the particles comprise primary particles, wherein at least part of the fiber-type carbon is attached to the inside of the primary particles.

6. The positive active material of claim 5, wherein the primary particles have a size of from about 100 nm to about 1000 nm.

7. The positive active material of claim 5, wherein a plurality of primary particles together form at least one secondary particle having a spherical shape and a particle diameter of from about 5 um to about 30 um.

8. The positive active material of claim 1, further comprising a carbon-based material in powder form, amorphous form, or a combination thereof.

9. A secondary lithium battery comprising:
a positive electrode,
a negative electrode,
and an electrolyte,
wherein the positive electrode comprises a positive active material comprising lithium phosphate compound particles represented by the following formula:

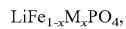

$LiFe_{1-x}M_xPO_4$, wherein M is Co, Mn, V, Mg, or a combination thereof, and $0 \leq x \leq 0.20$; and fiber-type carbon, wherein at least part of the fiber-type carbon is attached to an inside of lithium phosphate compound particles; and wherein the fiber-type carbon has a diameter from about 5 nm to about 25 nm and a length from about 5 μm to about 200 μm.

10. The secondary battery of claim 9, wherein the fiber-type carbon comprises carbon nanotube, vapor grown carbon fiber, carbon nano fiber, or a combination thereof.

11. The secondary battery of claim 9, wherein the part of the fiber-type carbon attached inside the lithium phosphate compound particles is from about 5 nm to about 1000 nm in length.

12. The secondary battery of claim 9, further comprising a carbon-based material in powder form, amorphous form, or a combination thereof.

13. The secondary battery of claim 9, wherein the particles comprise primary particles, wherein at least part of the fiber-type carbon is attached to the inside of the primary particles.

* * * * *